(12) United States Patent
Partyka et al.

(10) Patent No.: US 11,668,349 B2
(45) Date of Patent: Jun. 6, 2023

(54) FLEX COUPLING ASSEMBLY WITH RESTRICTIVE BENDING FEATURE

(71) Applicant: Steering Solutions IP Holding Corporation, Saginaw, MI (US)

(72) Inventors: Michael E. Partyka, Saginaw, MI (US); Sergio R. Molinar, Freeland, MI (US); William J. Knight, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 281 days.

(21) Appl. No.: 17/008,566

(22) Filed: Aug. 31, 2020

(65) Prior Publication Data

US 2022/0065304 A1 Mar. 3, 2022

(51) Int. Cl.
*F16D 3/12* (2006.01)
*F16D 3/78* (2006.01)
*B62D 1/16* (2006.01)

(52) U.S. Cl.
CPC ............ *F16D 3/12* (2013.01); *F16D 3/78* (2013.01); *B62D 1/163* (2013.01)

(58) Field of Classification Search
CPC .............. F16D 3/12; F16D 3/78; B62D 1/163
USPC .......................................................... 464/93
See application file for complete search history.

(56) References Cited

U.S. PATENT DOCUMENTS 4,389,204 A * 6/1983 Walter ............... F16D 3/58
464/95

* cited by examiner

*Primary Examiner* — Greg Binda
(74) *Attorney, Agent, or Firm* — Dickinson Wright PLLC

(57) ABSTRACT

A flex coupling assembly for coupling a first shaft to a second shaft of a shaft assembly. The flex coupling assembly includes a lower housing having a housing wall bounding a cavity between a first end having an end face and an open second end. A first shaft is fixed to the end face and extends along an axis. An upper flange, spaced from the lower housing, has a second shaft fixed thereto extending along the axis. A retention member, disposed in the cavity, is operably fixed to the upper flange. A resilient flex coupling, disposed between the end face and the flange, is operably fixed to the upper flange and the retention member and to the lower housing. The lower housing and the flange are moveable axially toward and away from one another and rotatably about the axis via flexing of the resilient flex coupling which dampens noise and vibrations between the first and second shafts.

18 Claims, 12 Drawing Sheets

FLEX COUPLING ASSEMBLY WITH RESTRICTIVE BENDING FEATURE

FIELD OF THE INVENTION

The present disclosure generally relates to shaft assemblies for motor vehicles, and more specifically, to flex coupling assemblies for joining shafts of a shaft assembly together.

BACKGROUND OF THE INVENTION

Automotive shaft assembly applications, such as steering shaft applications, commonly join shafts of a shaft assembly to one another with a dampening coupler. The dampening coupler is provided between the shafts of the steering shaft to dampen noise and vibration to isolate a driver from unwanted noise and vibrations coming from the engine bay and road. Although known dampening couplers can prove effective in reducing the amount of noise and vibration that reaches the driver, they typically reduce the bending stiffness of the shaft assembly. Increased bending stiffness requirements for shaft assemblies are being required by manufacturers, thereby causing the overall effectiveness of the dampening coupler to be compromised in its ability to dampen noise and vibration in order to meet the bending stiffness requirements. Accordingly, the noise and vibration dampening characteristics of flex couplers is being sacrificed in order to meet the bending stiffness requirements. Accordingly, what is needed is a dampening coupler that meets or exceeds both the increased demands for bending stiffness, while at the same time providing the level of noise and vibration dampening desired to prevent noise and vibration from reaching the driver.

SUMMARY OF THE INVENTION

It is an object of the present disclosure to provide a flex coupling assembly for coupling a first shaft of a shaft assembly to a second shaft of the shaft assembly that overcomes at least some of the drawbacks discussed above with known dampening couplers.

It is a further object of the present disclosure to provide a flex coupling assembly that is robust and durable in use, and economical in manufacture and assembly.

It is a further object of the present disclosure to provide a flex coupling assembly that decouples axial and torsional stiffness from bending stiffness, thereby allowing more freedom in design to tune the performance of the decoupling between first and second shafts.

It is a further object of the present disclosure to provide a flex coupling assembly that provides an ability to adjust the bending stiffness of the flex coupling assembly without affecting the torsional stiffness and the axial stiffness and noise and vibration dampening performance of the flex coupling assembly.

It is a further object of the present disclosure to provide a flex coupling assembly that provides an ability to adjust the torsional stiffness of the flex coupling assembly without affecting the bending stiffness and the axial stiffness and noise and vibration dampening performance of the flex coupling assembly.

It is a further object of the present disclosure to provide a flex coupling assembly that provides an ability to adjust the axial stiffness of the flex coupling assembly without affecting the bending stiffness and the torsional stiffness and noise and vibration dampening performance of the flex coupling assembly.

According to the objects and advantages, an aspect of the present disclosure provides a flex coupling assembly for coupling a first shaft of a shaft assembly to a second shaft of the shaft assembly. The flex coupling assembly includes a lower housing having a generally cylindrical housing wall extending along an axis and bounding a cavity between a lower housing first end and a lower housing second end. The lower housing first end has an end face extending generally transversely to the axis to generally closing off the cavity. The lower housing second end is generally open to the cavity. A first shaft is fixed to the end face of the lower housing and extends along the axis away from the cavity. An upper flange is spaced axially from the lower housing. A second shaft is fixed to the upper flange and extends along the axis. A retention member is disposed in the cavity of the lower housing and is fixed to the upper flange by a plurality of retention fastener members. A resilient flex coupling is sandwiched between the end face of the lower housing and the flange. The resilient flex coupling is fixed to the upper flange and to the retention member by the plurality of retention fastener members. The resilient flex coupling is fixed to the lower housing by a plurality of coupling fastener members. The lower housing and the flange are moveable relative to one another axially in opposite axial directions along the axis and rotatably about the axis via flexing of the resilient flex coupling.

In accordance with another aspect of the disclosure, the lower housing end face has a plurality of through openings and the plurality of retention fastener members extend through the plurality of through openings in clearance relation therewith. The plurality of through openings act as positive stops to limit the degree of relative rotation between the lower housing and the upper flange. The size of the through openings can be optimized, as desired, to provide the degree of relative movement desired for the specific application.

In accordance with another aspect of the disclosure, the lower housing has a plurality of fastener receptacles extending in parallel relation to the axis in the cavity. The plurality of fastener receptacles receive the plurality of coupling fastener members therethrough. The retention member has a plurality of slots sized for a clearance fit with the plurality of fastener receptacles, wherein said plurality of slots act as positive stops to limit the degree of relative rotation between the lower housing and the upper flange. The circumferentially extending width of the slots can be optimized, as desired, to provide the degree of relative movement desired for the specific application.

In accordance with another aspect of the disclosure, the plurality of through openings and the plurality of slots are circumferentially offset from one another to allow the axially extending package size of the flex coupling assembly to be minimized.

In accordance with another aspect of the disclosure, a plurality of spacer members are provided to receive the plurality of retention fastener members therethrough. The plurality of spacer members extend through the plurality of through openings in clearance relation therewith into engagement with the retention member and the resilient flex coupling.

In accordance with another aspect of the disclosure, the generally cylindrical housing wall and the retention member are spaced radially from one another by a gap and at least one bushing disposed in the gap, wherein the at least one bushing can be provided having a radial thickness, as desired, to regulate the bending stiffness across the flex coupling assembly between the first and second shafts, and wherein the material of at least one bushing can be provided, as desired, to optimize the amount friction against an inner surface of the cylindrical housing wall.

In accordance with another aspect of the disclosure, at least one bushing can be provided as a pair of bushings arranged diametrically opposite one another.

In accordance with another aspect of the disclosure, at least one bushing is fixed to one of the generally cylindrical inner housing wall and the retention member.

In accordance with another aspect of the disclosure, the resilient flex coupling can be provided having a metal core overmolded with an elastomeric body.

In accordance with another aspect of the disclosure, the resilient flex coupling has a first side with a plurality of first protrusions extending axially outwardly therefrom into engagement with the end face of the lower housing and a second side with a plurality of second protrusions extending axially outwardly therefrom into engagement with the upper flange. The first and second protrusions provide pivot locations for axial deflection of the resilient flex coupling thereabout to allow for axial movement between the first and second shafts, as desired. The axial height of the first and second protrusions can be provided as desired to regulate the amount of axial deflection, as desired for the intended application.

In accordance with another aspect of the disclosure, the plurality of first protrusions includes a pair of first protrusions arranged diametrically opposite one another and the plurality of second protrusions includes a pair of second protrusions arranged diametrically opposite one another, said first pair of protrusions being arranged in circumferentially offset relation with said second pair of protrusions.

In accordance with another aspect of the disclosure, a flex coupling assembly for coupling a first shaft of a shaft assembly to a second shaft of the shaft assembly includes, a lower shaft subassembly, an upper shaft subassembly, and a flex coupling sandwiched between the lower shaft subassembly and the upper shaft subassembly and operably connecting the lower shaft subassembly to the upper shaft subassembly. The lower shaft subassembly includes a lower housing having a generally cylindrical housing wall extending along an axis and bounding a cavity between a lower housing first end and a lower housing second end. The lower housing first end has an end face extending generally transversely to the axis and a lower housing first shaft is fixed to the end face. The first shaft extends along the axis away from the cavity. The upper shaft subassembly includes an upper flange and an upper second shaft fixed to the upper flange, with the second shaft extending along the axis, and a retention member fixed to the upper flange by a plurality of retention fastener members. The resilient flex coupling that operably couples the lower shaft subassembly to the upper shaft subassembly allows the lower housing and the flange to move relative to one another axially along the axis and rotatably about the axis via flexing of the resilient flex coupling. The resilient flex coupling is fixed between the upper flange and the retention member by the plurality of retention fastener members. The resilient flex coupling is fixed to the lower housing by a plurality of coupling fastener members.

These and other objects, advantages and features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
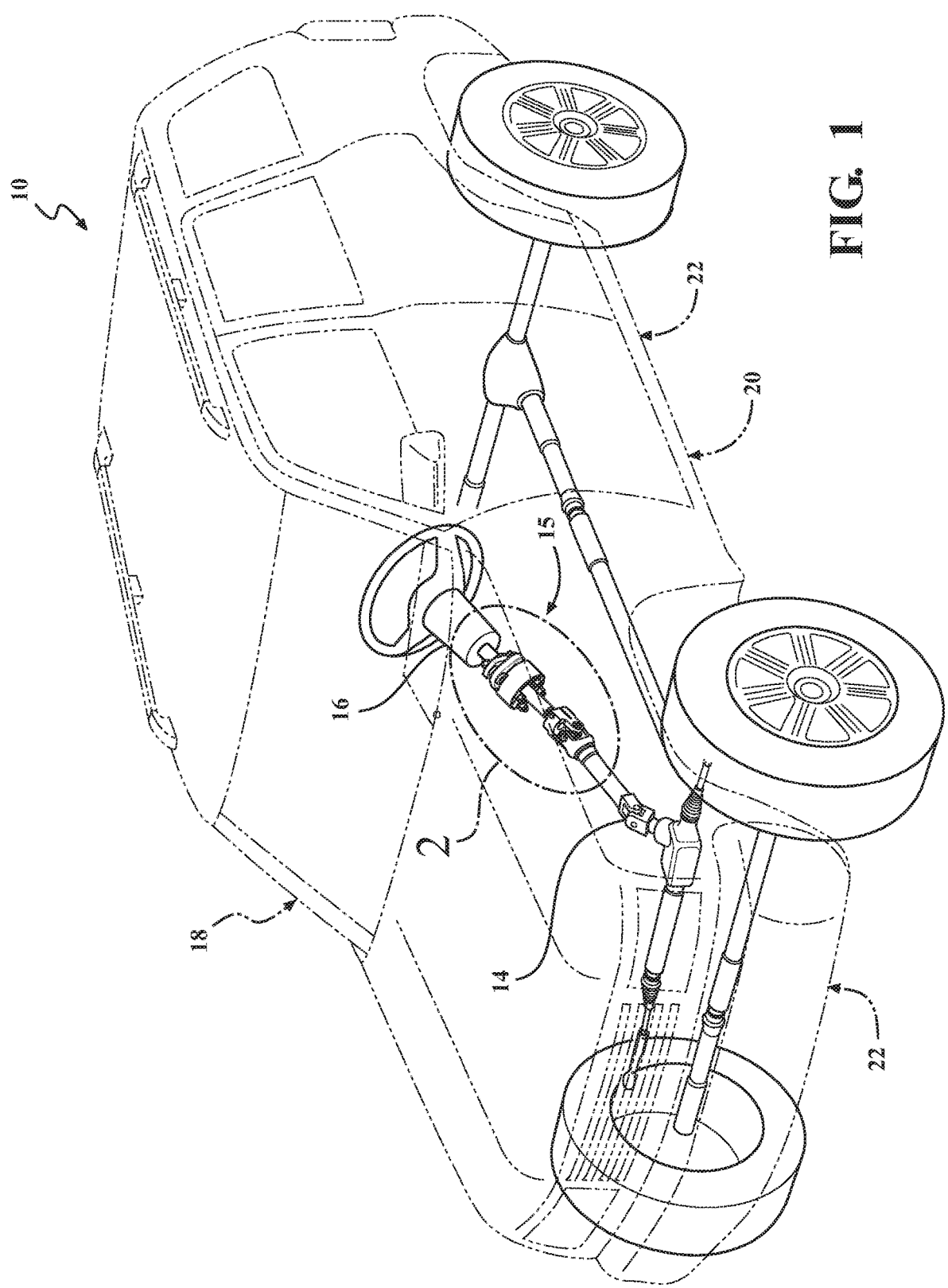
FIG. 1 is a perspective view of a motor vehicle having a steering system including a flex coupling assembly constructed in accordance with one aspect of the invention.
Figure 2:
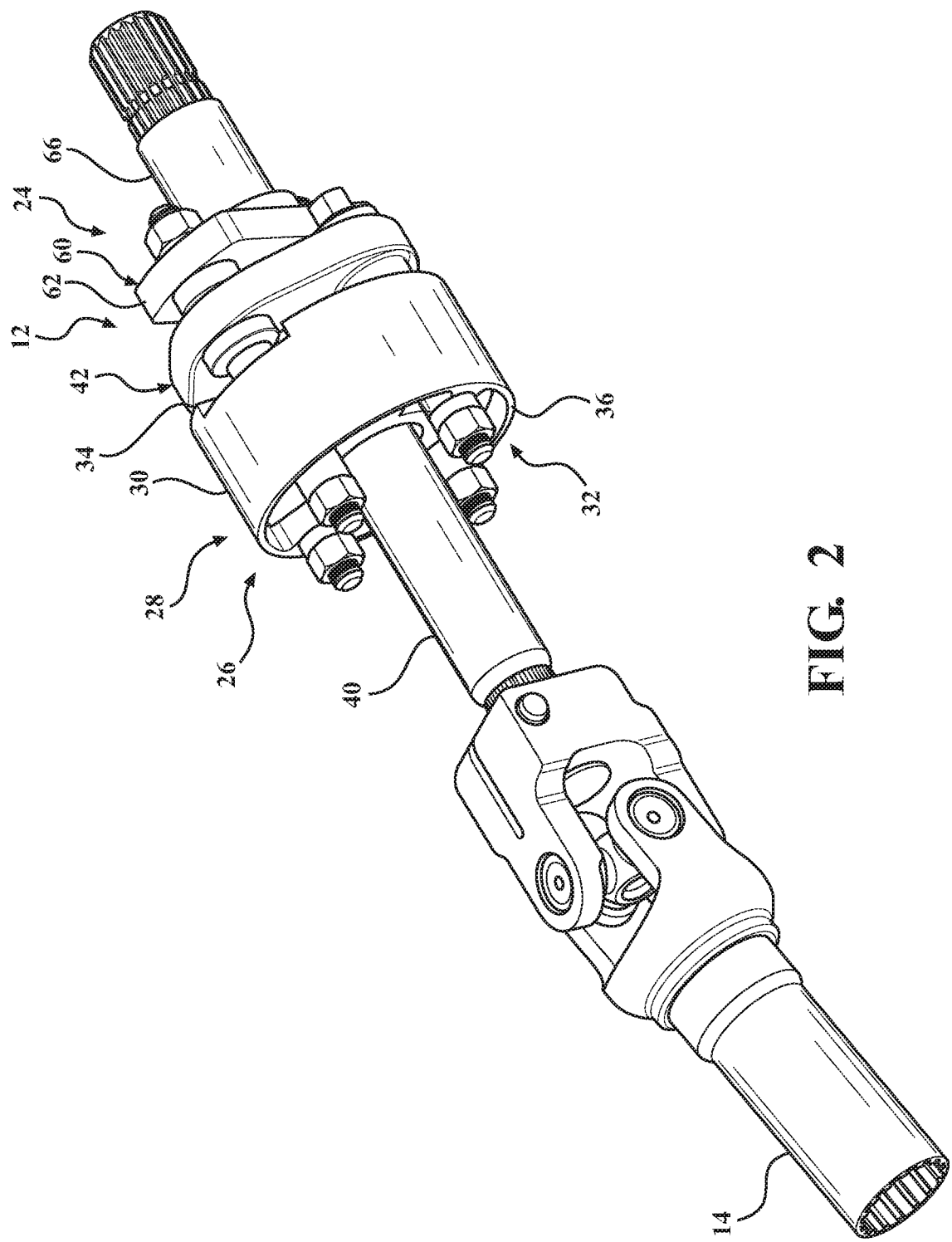
FIG. 2 is a perspective view of the flex coupling assembly of FIG. 1 shown coupled to a lower cardan joint assembly of the steering system.
Figure 3A:
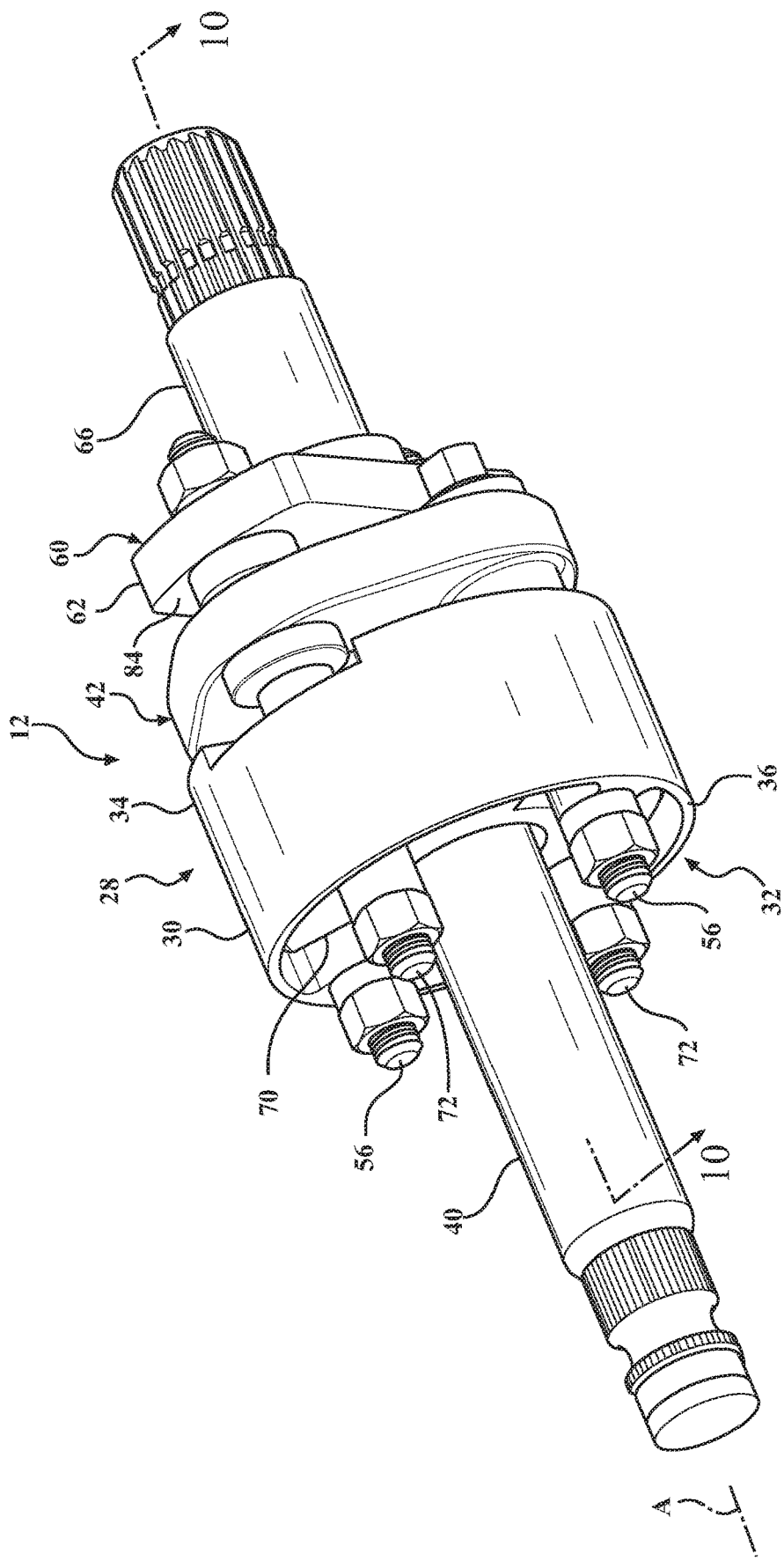
FIG. 3A is a view similar to FIG. 2 of the flex coupling assembly with the cardan joint assembly removed from the flex coupling assembly.
Figure 3B:
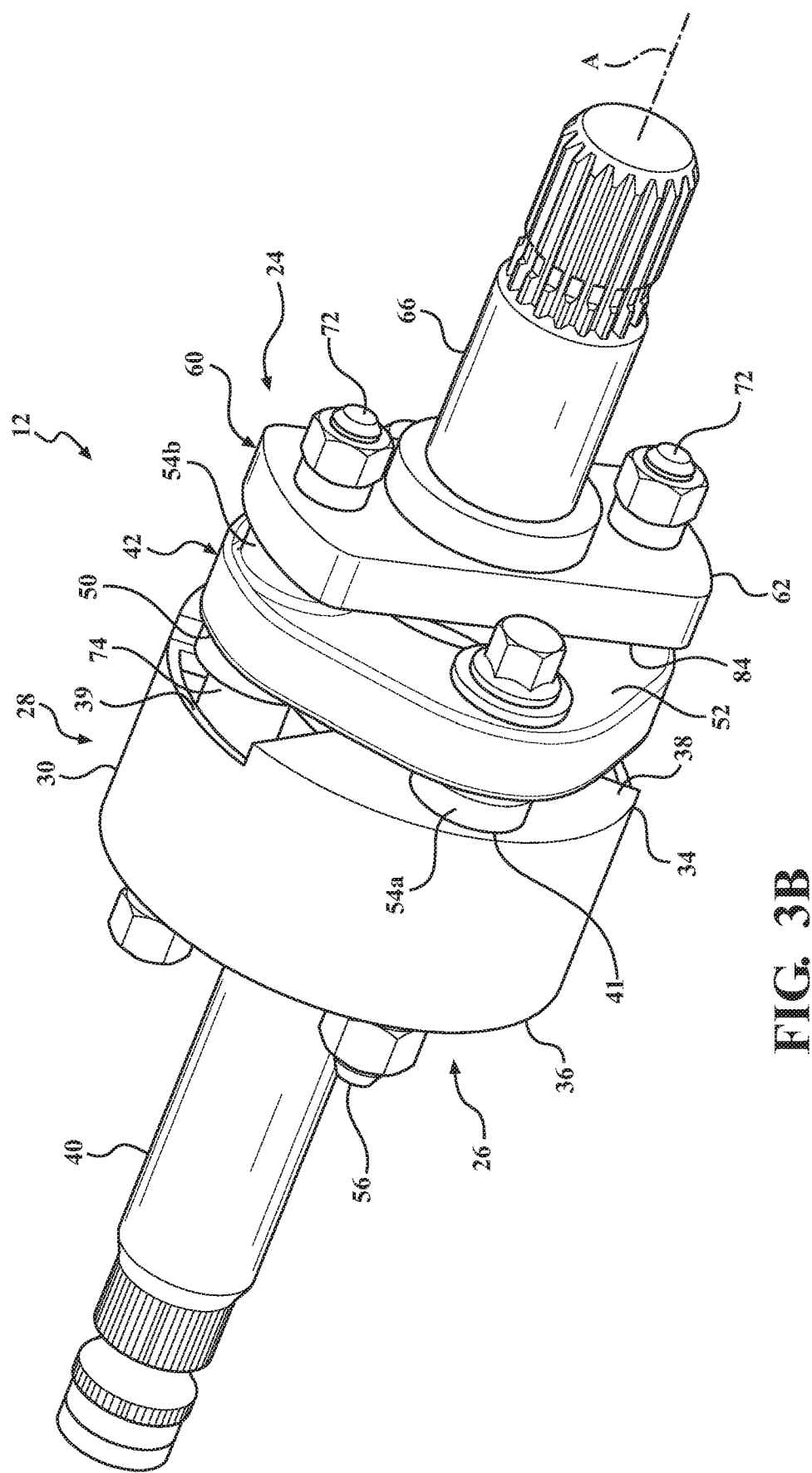
FIG. 3B is a view similar to FIG. 2 looking from an opposite end of the flex coupling assembly.
Figure 4:
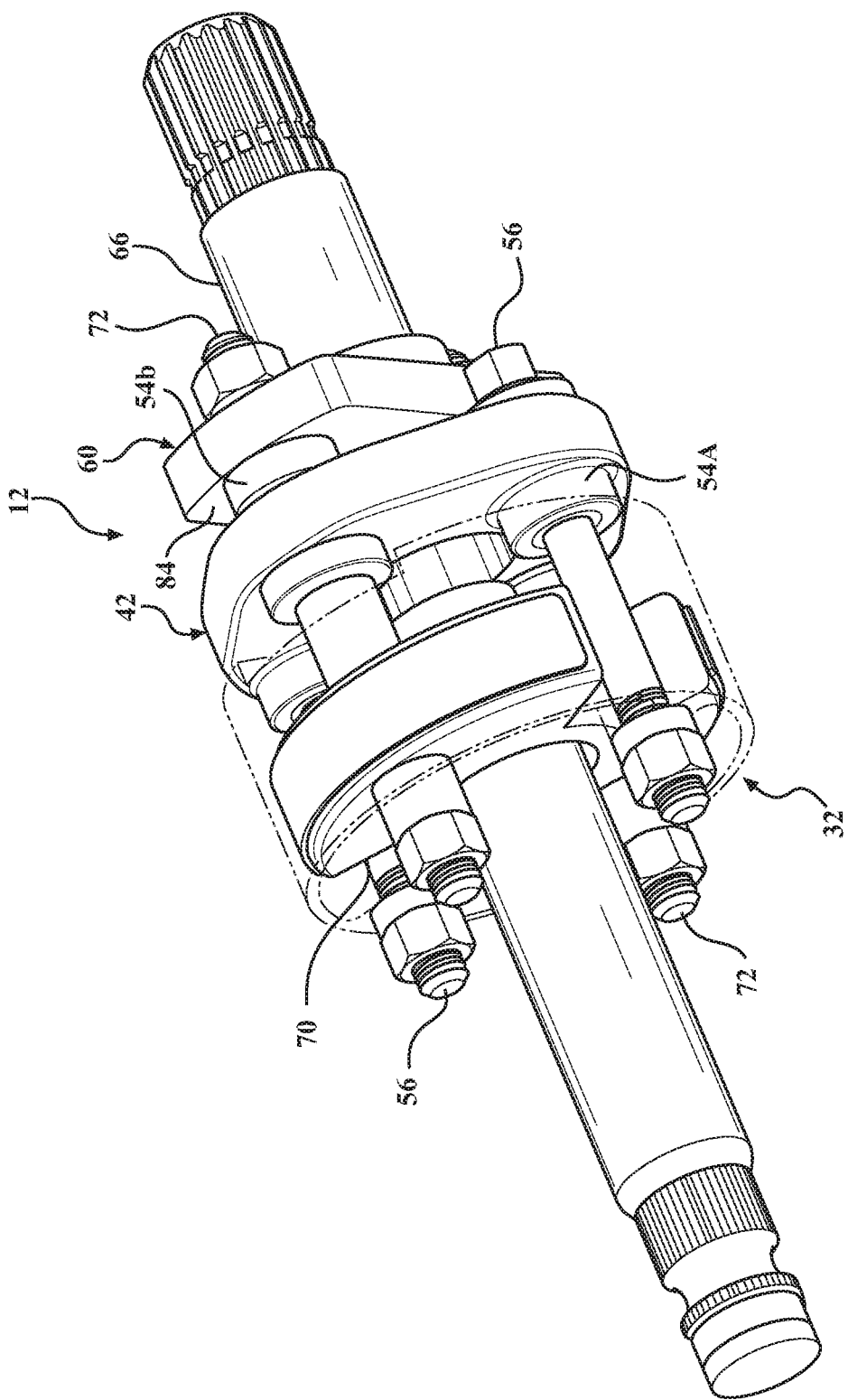
FIG. 4 is a view similar to FIG. 3 with an outer housing of the flex coupling assembly shown in transparency for clarity of internal components.
Figure 5:
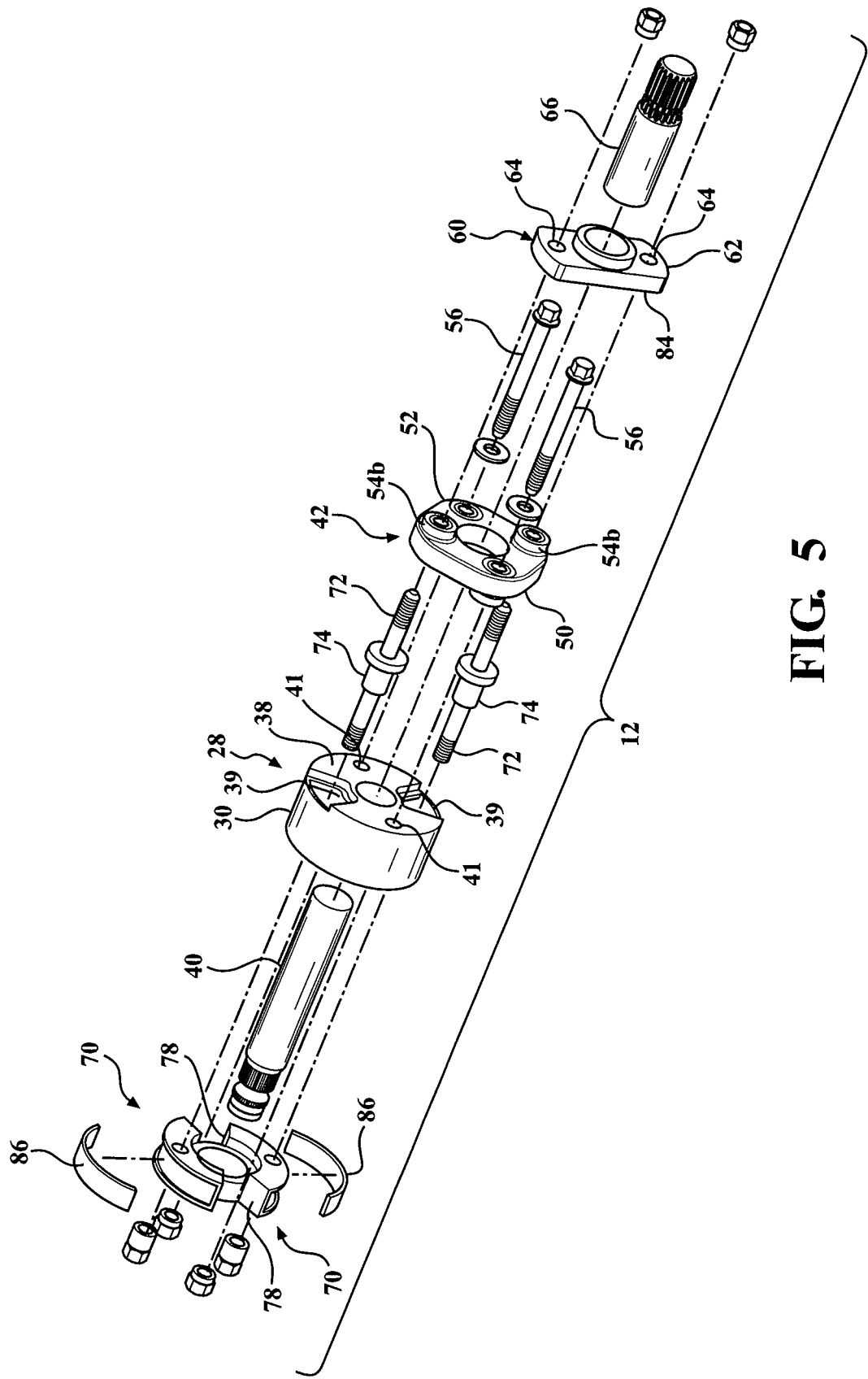
FIG. 5 is an exploded view of the flex coupling assembly of FIG. 3B.

Referring now to the Figures, where the invention will be described with reference to specific embodiments, without limitation, FIG. 1 illustrates a motor vehicle 10 having a flex coupling assembly 12 (identified in FIGS. 2-5) arranged in accordance with one aspect of the disclosure for coupling a first shaft 14 of a shaft assembly 15 to a second shaft 16 of the shaft assembly 15. In the non-limiting, exemplary embodiment illustrated, the flex coupling assembly 12 is integrated into a steering system 18 of the motor vehicle 10, although it is contemplated herein that the flex coupling assembly 12 could be integrated into other shaft assemblies, including a drive shaft assembly 20, axle assembly 22, or otherwise. The flex coupling assembly 12, as discussed further hereafter, provides an ability to regulate the bending stiffness of the shaft assembly 15 without affecting the torsional stiffness, axial stiffness and dampening performance of the flex coupling assembly 12. Thus, it is to be recognized that the bending stiffness across the flex coupling assembly 12 is isolated and decoupled from the axial and torsional stiffness of the flex coupling assembly 12, thereby providing an ability to adjust the bending stiffness, as desired, without affecting the torsional stiffness, axial stiffness and dampening performance of the flex coupling assembly 12.

Figure 7:
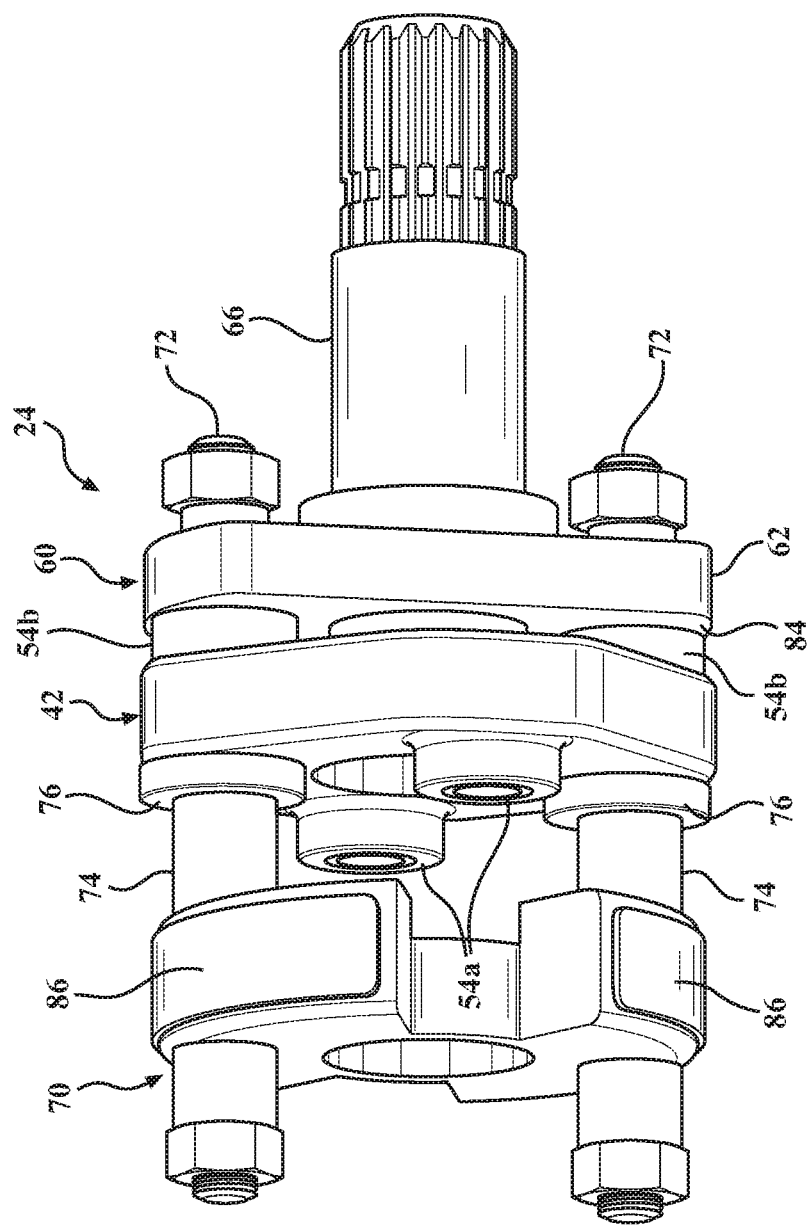
FIG. 7 is a perspective view of an upper shaft assembly of the flex coupling assembly with the flex coupling shown fixed thereto.
Figure 8:
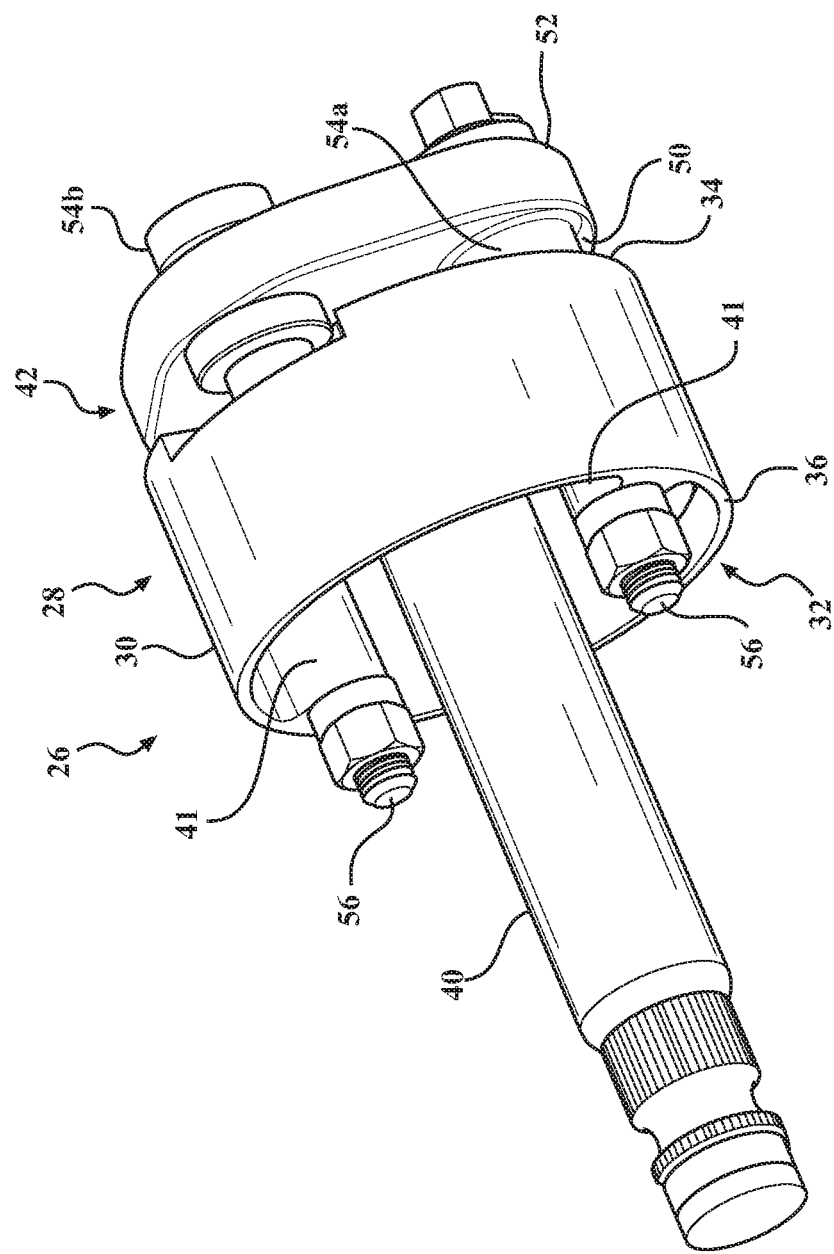
FIG. 8 is a perspective view of a lower shaft assembly of the flex coupling assembly with the flex coupling shown fixed thereto.

The flex coupling assembly 12 has an upper shaft subassembly 24 (FIG. 7), a lower shaft subassembly 26 (FIGS. 8, 9A and 9B), and a flex coupling 42 sandwiched between the upper shaft subassembly 24 and the lower shaft subassembly 26 and operably connecting the upper shaft assembly 24 to the lower shaft assembly 26. The lower shaft subassembly 26 includes a lower housing 28 having a generally cylindrical housing wall 30 extending along an axis A. The housing wall 30 bounds a cavity 32 that extends between a lower housing first end 34 and a lower housing second end 36. The lower housing first end 34 has a lower housing end wall, also referred to as end face 38, extending along a plane generally transversely to the axis A. The lower housing end face 38 has at least one, and shown as a plurality, and more particularly a pair of diametrically opposite through openings 39 shown being diametrically opposite one another, by way of example and without limitation. The lower housing end face 38 further at least one, and shown as a plurality, and more particularly a pair of diametrically opposite fastener receptacles, also referred to as fastener openings 41, shown being diametrically opposite one another, by way of example and without limitation. The fastener openings 41 and the through openings 39 are arranged in circumferentially offset relation with one another, shown as being offset by about 90 degrees with one another. The lower housing second end 36 is open, shown as having the generally cylindrical inner housing wall 30 terminating a circular free edge. The lower shaft subassembly 26 further includes a lower housing first shaft 40 fixed to the lower housing end face 38, such as via a weld joint, by way of example and without limitation, with the first shaft 40 extending coaxially along the axis A away from the lower housing cavity 32.

Figure 6:
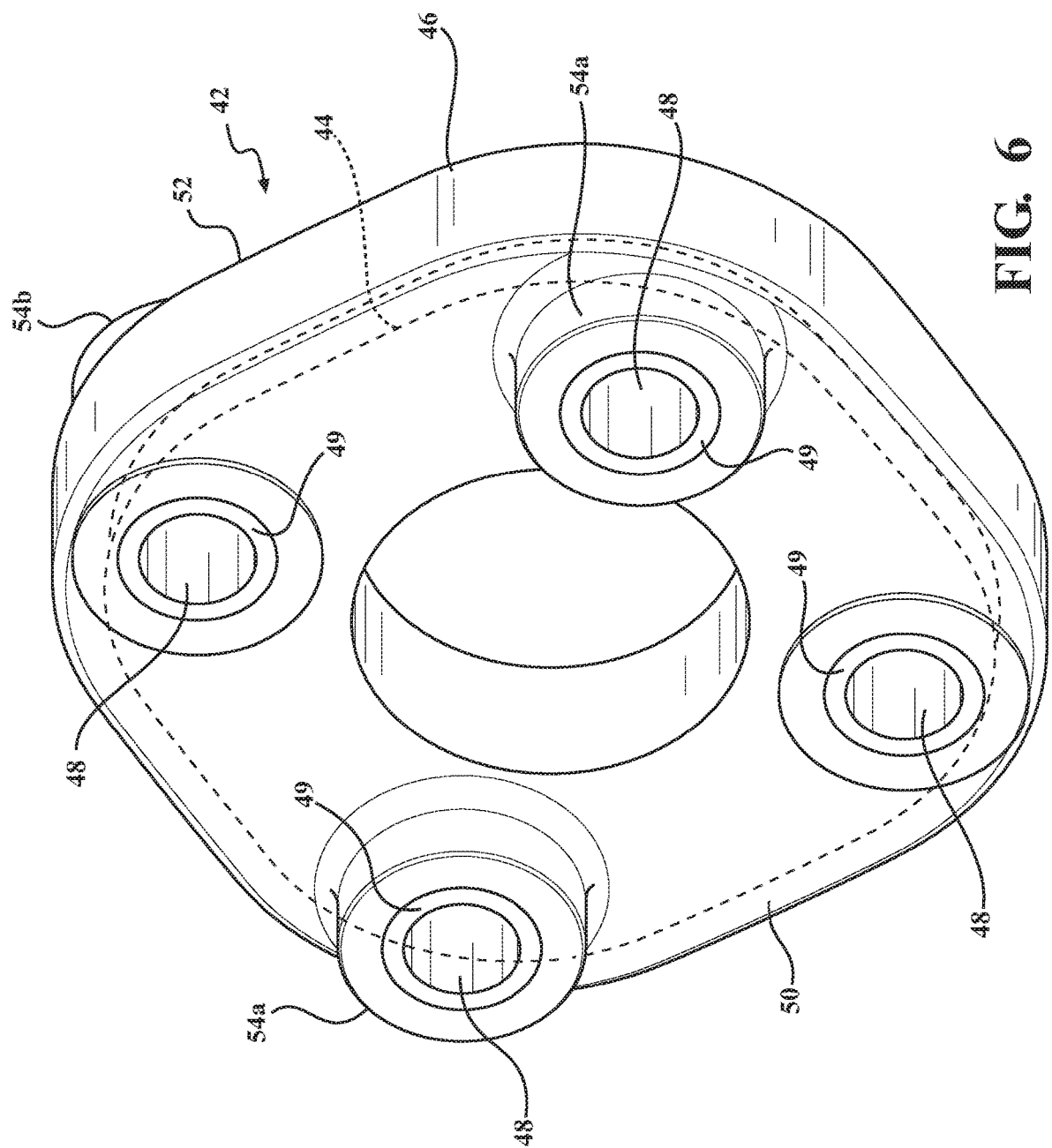
FIG. 6 is a perspective view of a flex coupling of the flex coupling assembly shown in transparency for clarity purposes of internal components.

The resilient flex coupling 42, as shown in FIG. 6, has a resilient, relatively rigid core 44, overmolded with an elastomeric body 46. The core 44 can be formed from a metal material, such as a metal plate or wound wire, by way of example and without limitation. The elastomeric body 46 can be formed of rubber or some other polymeric material. The resilient flex coupling 42 has at least one, and shown as a plurality of fastener openings 48 extending through opposite sides 50, 52. The fastener openings 48 can be provided via crush resistant tubular inserts, also referred to as bushings 49. The bushings 49 can be made of metal or a high crush strength polymeric material. One of the sides, referred to hereafter as first side 50, has a pair of protrusions, also referred to as first bosses 54a, extending axially outwardly therefrom. The first bosses 54a are arranged diametrically opposite one another. The other of the sides, referred to hereafter as second side 52, has a pair of protrusions, also referred to as second bosses 54b, extending axially outwardly therefrom. The second bosses 54b are arranged diametrically opposite one another. The first bosses 54a and the second bosses 54b are arranged in circumferentially offset relation with one another, shown as being offset by about 90 degrees with one another. The offset, out-of-phase relation facilitates axial flexing of the resilient flex coupling, as desired to reduce the transmission of noise and vibration between the first and second shafts 14, 16. The resilient flex coupling 42 is fixed to the lower housing 28 via a plurality of coupling fasteners 56, shown as a pair of threaded fasteners 56 extending through a pair of the fastener openings 48 in the flex coupling 42 into threaded engagement with the threaded fastener openings 41 in the inner housing end face 38. Upon being fixed to the lower housing 28, the bosses 54a are brought into engagement with an outer surface of the lower housing end face 38 and the first side 50 is spaced axially from the outer surface of the lower housing end face 38 by an axial height of the bosses 54a. The bushings 49 function to prevent axial compression of the respective bosses 54a, 54b, while facilitating deflection of the resilient flex coupling 42, as desired and as discussed herein to allow controlled and limited relative axial movement between the first and second shafts 14, 16.

The upper shaft subassembly 24 includes an upper flange 60 having a generally planar wall 62, shown as being generally rectangular. The wall 62 has a plurality, and shown as a pair of fastener openings 64 configured for receipt of a plurality of retention fasteners 72 therethrough. The upper shaft subassembly 24 further includes a second shaft 66 fixed to the upper flange 60, such as via a press fit within a central opening 68, a weld joint, or an adhesive, by way of example and without limitation, with the second shaft 66 extending coaxially along the axis A. The upper shaft assembly 24 further includes a retention member 70 fixed to the upper flange 60 by the plurality, and shown as a pair, of retention fastener members 72. The resilient flex coupling 42 that operably couples the lower shaft subassembly 26 to the upper shaft subassembly 24 and allows the lower housing 28 and the flange 60 to move relative to one another axially along the axis A and rotatably about the axis A via flexing of the resilient flex coupling 42. The resilient flex coupling 42 is fixed between the upper flange 60 and the retention member 70 by the plurality of retention fastener members 72, and the resilient flex coupling 42 is fixed to the lower housing 28 by the plurality of coupling fastener members 56, wherein the resilient flex coupling 42 is sandwiched between the end face 38 of the lower housing 28 and the upper flange 60.

The retention member 70 is disposed in the cavity 32 of the lower housing 28 and is fixed to the upper flange 60 by the plurality of retention fastener members 72. The plurality, shown as a pair, of fastener members 72 extend through the through openings 39 of the end face 38 in clearance relation therewith, wherein the plurality of through openings 39 act as a positive stop to limit the degree of relative rotation between the lower housing 28 and the upper flange 60. A plurality of spacer members 74 are configured to receive the plurality of retention fastener members 72 therethrough. The plurality of spacer members 74 extend through the plurality of through openings 39 in clearance relation therewith, shown as extending into the cavity 32, into engagement with both the retention member 70 and the resilient flex coupling 42. The spacer members 74 are illustrated, by way of example and without limitation, as having an enlarged head 76 at one end for engagement with the resilient flex coupling 42 so as to avoid locally deforming the resilient flex coupling 42 in the area of engagement therewith. The through openings 39 provide a clearance fit with the spacer members 74 and act as a positive stop upon coming into engagement with the spacer members 74 to limit, as predetermined by controlling the size of the clearance fit, the degree of relative rotation between the lower housing 28 and the upper flange 60.

Figure 9A:
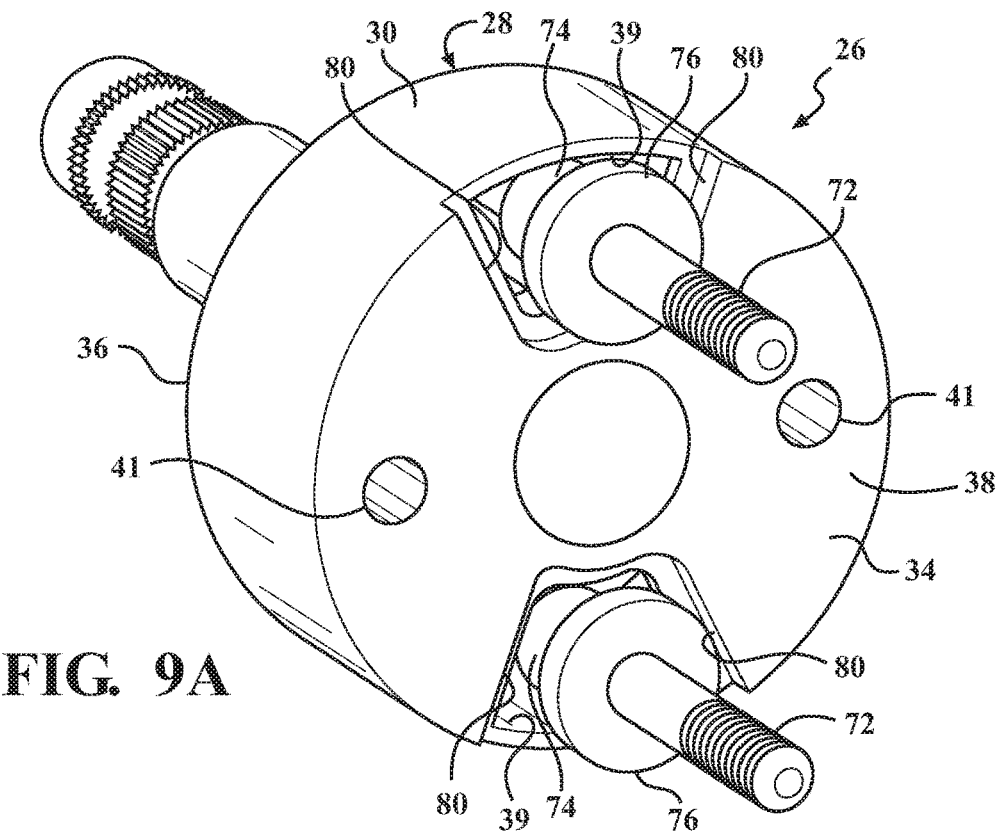
FIG. 9A is an end perspective view of the second shaft assembly of FIG. 8 shown with retention fastener members extending therethrough.
Figure 9B:
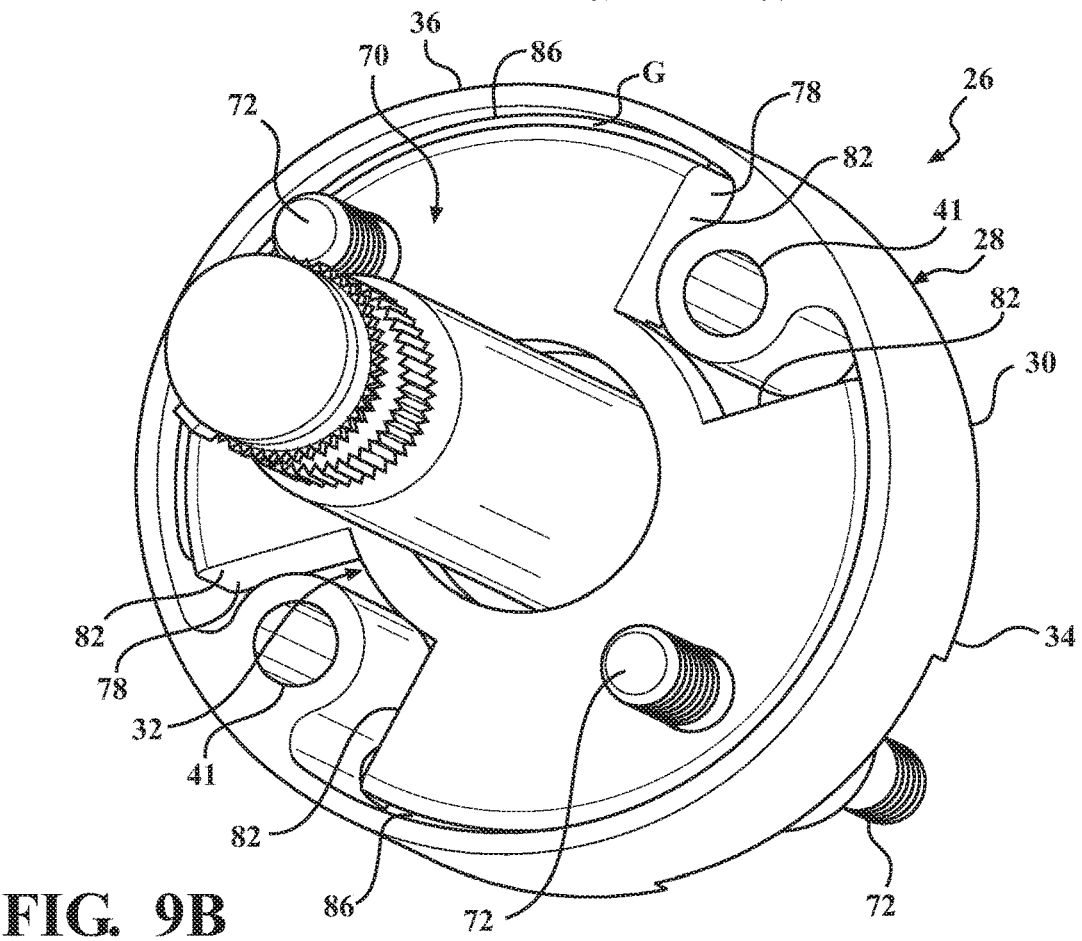
FIG. 9B is view similar to FIG. 9A looking from an opposite end of the second shaft assembly shown with a retention member fixed in a cavity of a housing of the second shaft assembly by the retention fastener members.

The fastener receptacles 41 are shown as elongate bosses extending along an inner surface of the wall 30 in the cavity 32. The fastener receptacles 41 extend in parallel relation to the axis A, with the plurality of fastener receptacles 41 receiving the plurality of coupling fastener members 56 therethrough. The retention member 70 has a plurality, shown as a pair of diametrically opposite notches, also referred to as slots 78 (FIG. 9B), sized for a clearance fit with the plurality of fastener receptacles 41. The clearance fit can be controlled as desired to limit the degree of relative rotation between the lower housing 28 and the upper flange 60. Accordingly, in addition to the through openings 39, the slots 78 act as rotational positive stops, wherein the plurality of through openings 39 and the plurality of slots 78 are circumferentially offset from one another. Upon the enlarged heads 76 of the spacer members 74 engaging radially extending peripheries 80 of the through openings 39 (FIG. 9A, illustrating that the enlarged heads 76 do not fit through the through openings 39, thereby requiring a unidirectional assembly of retention fastener members 72 through the through openings 39, as will be understood by one possessing ordinary skill in the art), and/or upon radially extending sides 82 of the slots 78 engaging the fastener receptacles 41 (FIG. 9B), the first and second shafts 40, 66 become rotationally locked in conjoint rotation with one another. Of course, it is to be recognized that upon the torque between the first and second shafts 40, 66 being reduced, the resiliency of the resilient flex coupling 42 imparts a bias between the lower housing 28 and upper flange 60 causing a re-centering, relaxed positioning between the peripheries 80 with the spacer members 74 and between the sides 82 of the slots 78 and the fastener receptacles 41.

Figure 10:
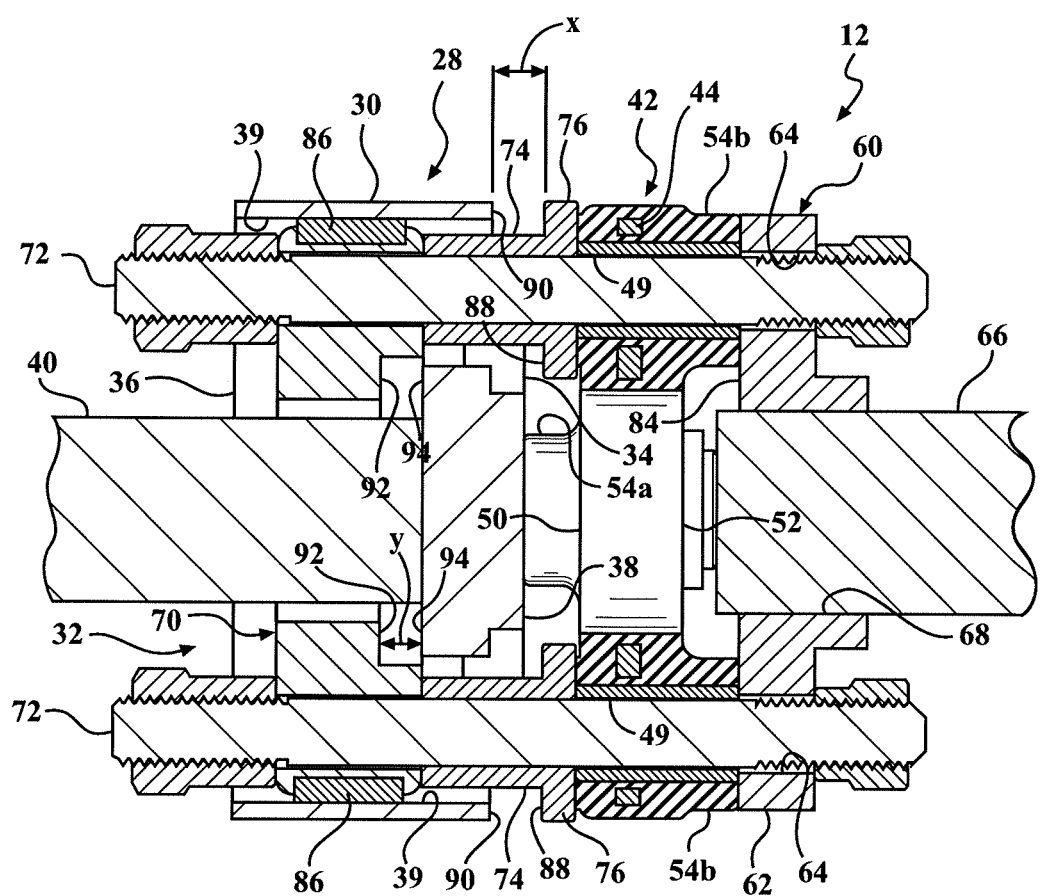
FIG. 10 is a cross-section view taken generally along the line 10-10 of FIG. 3A.
Figure 10A:
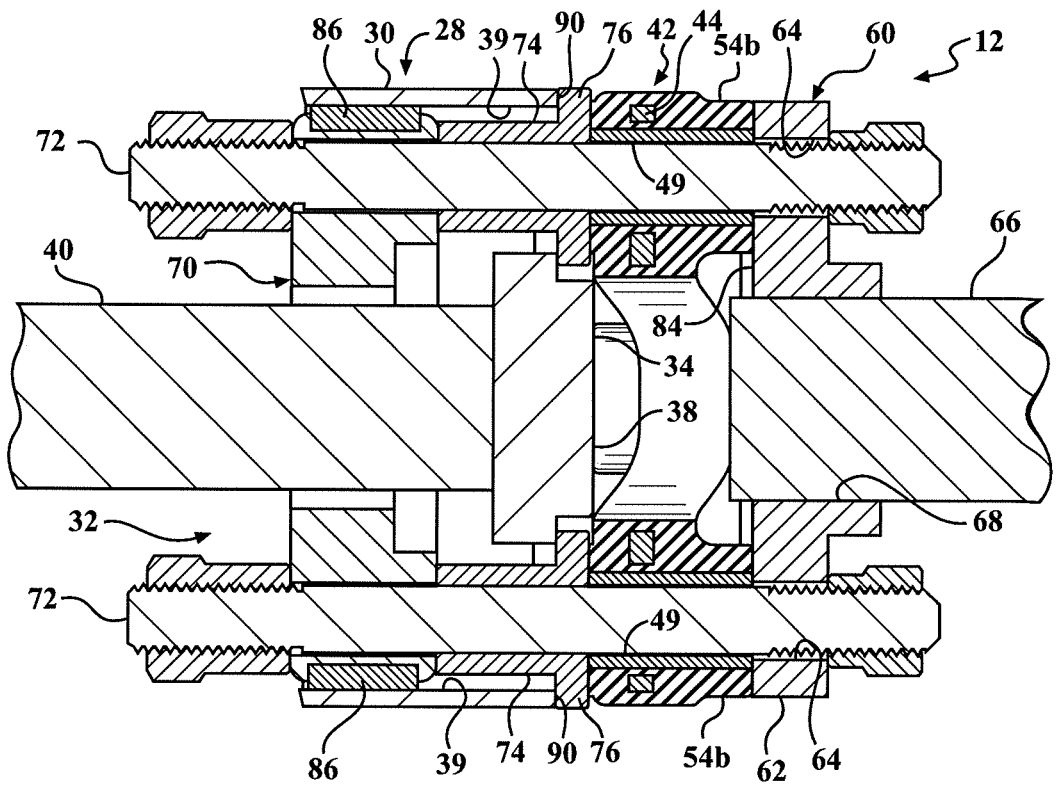
FIG. 10A is a view similar to FIG. 10 showing the flex coupling assembly in an axially compressed state.
Figure 10B:
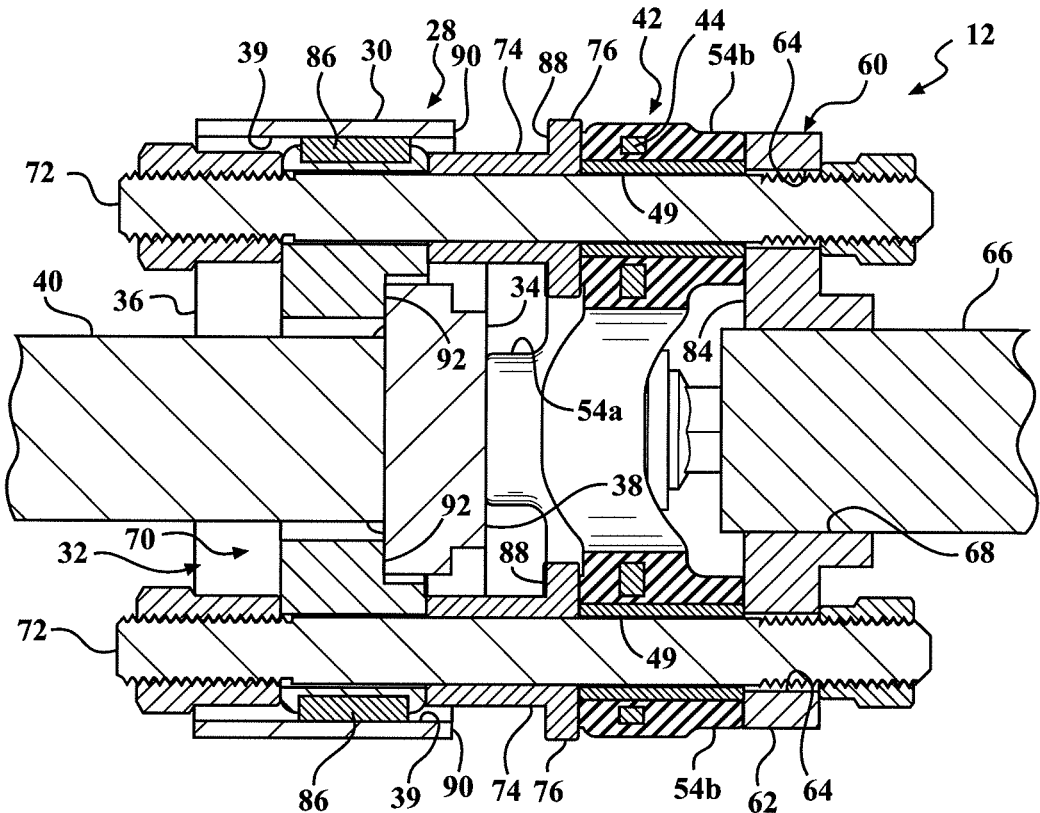
FIG. 10B is a view similar to FIG. 10 showing the flex coupling assembly in an axially extended state.

As mentioned above, the upper shaft assembly 24 and the lower shaft assembly 26 are able to move axially relative to another via axial translation and flexing of the resilient flex coupling 42. An axial clearance "X" between radially extending positive stop surfaces 88 of the enlarged heads 76 and radially extending positive stop surfaces 90 of lower housing 28, and an axial clearance "Y" between a radially extending positive stop surface 92 of retention member 70 and a radially extending positive stop surface 94 of first shaft 40 permits the lower housing 28 and the flange 60, and thereby the lower shaft assembly 26 and upper shaft assembly 24, to move axially relative to one another under an axial load applied to at least one of the first and second shafts 40, 66 along axis A. It is to be recognized that the positive stop surface 94 of the first shaft 40 can be formed as a monolithic piece of material with the first shaft, or it can be provided as a separate piece of material fixed to the first shaft 40, as will be understood by one possessing ordinary skill in the art. As such, axial telescopic dampening is provided between the first and second shafts 40, 66, wherein the dampening is facilitated and controlled by the axial flex rigidity provided by the resilient flex coupling 42. Upon the respective positive stop surfaces 88, 90 coming into engagement with one another (FIG. 10A), the first and second shafts 40, 66 become substantially fixed against compressive axial movement toward one another, and upon the respective positive stop surfaces 92, 94 coming into engagement with one another (FIG. 10B), the first and second shafts 40, 66 become substantially fixed against tensile axial movement away from one another. Of course, it is to be recognized that upon the axial force between the first and second shafts 40, 66 causing axial movement between the first and second shafts 44, 66 being reduced, the resiliency of the resilient flex coupling 42 imparts an axial bias between the upper and lower shaft subassemblies 24, 26 causing the lower housing 28 and upper flange 60 to return to their relaxed, as assembled axial positions (FIG. 10). In FIG. 10A, the upper and lower shaft subassemblies 24, 26 are shown axially compressed toward one another with the positive stop surfaces 88, 90 of the enlarged heads 76 and the lower housing 28, respectively, engaging one another and with the resilient flex coupling 42 being resiliently flexed in a first axial direction, with the enlarged heads 76 and the upper flange 60 remaining engaged with opposite ends of the bosses 54B, while in FIG. 10B, the upper and lower shaft subassemblies 24, 26 are shown axially extended away from one another with the positive stop surfaces 92, 94 of the retention member 70 and the first shaft 40, respectively, engaging one another and with the resilient flex coupling 42 being resiliently flexed in a second axial direction opposite the first axial direction of FIG. 10A, with the enlarged heads 76 and the upper flange 60 remaining engaged with opposite ends of the bosses 54B, as will be understood by a person possessing ordinary skill in the art upon view the entirety of the disclosure herein.

The generally cylindrical housing wall 30 and the retention member 70 are spaced radially from one another by a uniform, constant gap G (FIG. 9B) along diametrically opposite sides of the retention member 70, over regions extending between the slots 78 in the retention member 70. At least one bushing, and shown as a pair of diametrically opposite bushings 86 are disposed in diametrically opposite gaps G. The bushings 86 are fixed to one of an inwardly facing surface of the generally cylindrical inner housing wall 30 and an outwardly facing surface of the retention member 70 and free relative to the other of the generally cylindrical inner housing wall 30 and an outwardly facing surface of the retention member 70. The bushings 86 are shown as being circumferentially discontinuous due to the presence of the fastener receptacles 41. The bushings 86 can be fixed to the desired generally cylindrical inner housing wall 30 or outwardly facing surface of the retention member 70 via at least one of a press fit, a weld joint, an adhesive, or otherwise. To further facilitate retention of the bushings 86 to the respective generally cylindrical inner housing wall 30 or outwardly facing surface of the retention member 70, the respective generally cylindrical inner housing wall 30 or outwardly facing surface of the retention member 70 could be provided with a lip, such as a curled lip (inwardly for the lower housing wall 30 and outwardly for the retention member 70) to retain the bushings 86 against moving axially outwardly from its intended fixed position within the gap G. The bushings 86 can be formed of any desired material, including metal or plastic, with the selected material providing a reduced friction surface to facilitate the aforementioned relative torsional (rotational) and axial movement between the housing wall 30 and the retention member 70. The bushings 86 can be provided to occupy the full gap G (slight interference to a line-to-line fit), or substantially the full gap G (substantially meaning that a slight gap of between about 0.0001-0.005 inches could remain). With the gap G being substantially reduced or eliminated, the bending stiffness between the lower housing 28 and the retention member 70, and thus, between the respective first and second shafts 40, 66, is increased. The bending stiffness is further increased as a result of the resistance to bending, i.e. the interface between lower housing 28 and the retention member 70, being spaced radially outwardly from the axis A along which a bending force would be generated. Accordingly, it will be recognized by one possessing ordinary skill in the art that the upper shaft subassembly 24 and the lower shaft subassembly 26 are able to rotate and translate relative to their common axis A along which first and second shafts 14, 16, 40, 66 extend via flexing of resilient flex coupling 42, as discussed above, while the lower housing wall 30 and the outer surface of the retention member 70 restrict bending between the upper shaft subassembly 24 and the lower shaft subassembly 26, thereby restricting bending between the first and second shafts 14, 16, 40, 66.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:

1. A flex coupling assembly for coupling a first shaft of a shaft assembly to a second shaft of the shaft assembly, comprising:
   a lower housing having a generally cylindrical housing wall extending along an axis and bounding a cavity between a lower housing first end and a lower housing second end, said lower housing first end having an end face extending generally transversely to said axis and generally closing off said cavity and said lower housing second end being generally open to said cavity;
   a first shaft fixed to said end face of said lower housing and extending along said axis away from said cavity;
   an upper flange spaced axially from said lower housing;
   a second shaft fixed to said upper flange and extending along said axis;
   a retention member disposed in said cavity of said lower housing and being fixed to said upper flange by a plurality of retention fastener members;
   a resilient flex coupling sandwiched between said end face of said lower housing and said flange, said resilient flex coupling being fixed to said upper flange and to said retention member by said plurality of retention fastener members, said resilient flex coupling being fixed to said lower housing by a plurality of coupling fastener members,
   wherein said lower housing and said upper flange are moveable relative to one another axially along said axis and relative to one another rotatably about said axis via flexing of said resilient flex coupling,
   wherein said lower housing end face has a plurality of through openings, said plurality of retention fastener members extending through said plurality of through openings in clearance relation therewith, wherein said plurality of through openings act as a positive stop to limit the degree of relative rotation between said lower housing and said upper flange.

2. The flex coupling assembly of claim 1, wherein said lower housing has a plurality of fastener receptacles extending in parallel relation to said axis in said cavity, said plurality of fastener receptacles receiving said plurality of coupling fastener members therethrough, said retention member having a plurality of slots sized for a clearance fit with said plurality of fastener receptacles, wherein said plurality of slots act as a positive stop to limit the degree of relative rotation between said lower housing and said upper flange.

3. The flex coupling assembly of claim 2, wherein said plurality of through openings and said plurality of slots are circumferentially offset from one another.

4. The flex coupling assembly of claim 1, further including a plurality of spacer members receiving said plurality of retention fastener members therethrough, said plurality of spacer members extending through said plurality of through openings in clearance relation therewith into engagement with said retention member and said resilient flex coupling.

5. The flex coupling assembly of claim 1, wherein said lower housing has a plurality of fastener receptacles extending in parallel relation to said axis in said cavity, said plurality of fastener receptacles receiving said plurality of coupling fastener members therethrough, said retention member having a plurality of slots sized for a clearance fit with said fastener receptacles, wherein said plurality of slots act as a positive stop to limit the degree of relative rotation between said lower housing and said upper flange.

6. The flex coupling assembly of claim 1, wherein said generally cylindrical housing wall and said retention member are spaced radially from one another by a gap and further including at least one bushing disposed in said gap.

7. The flex coupling assembly of claim 6, wherein said at least one bushing includes a pair of bushings arranged diametrically opposite one another.

8. The flex coupling assembly of claim 6, wherein said at least one bushing is fixed to one of said generally cylindrical inner housing wall and said retention member.

9. The flex coupling assembly of claim 1, wherein said resilient flex coupling has a metal core overmolded with an elastomeric body.

10. A flex coupling assembly for coupling a first shaft of a shaft assembly to a second shaft of the shaft assembly, comprising:
   a lower housing having a generally cylindrical housing wall extending along an axis and bounding a cavity between a lower housing first end and a lower housing second end, said lower housing first end having an end face extending generally transversely to said axis and generally closing off said cavity and said lower housing second end being generally open to said cavity;
   a first shaft fixed to said end face of said lower housing and extending along said axis away from said cavity;
   an upper flange spaced axially from said lower housing;
   a second shaft fixed to said upper flange and extending along said axis;
   a retention member disposed in said cavity of said lower housing and being fixed to said upper flange by a plurality of retention fastener members;
   a resilient flex coupling sandwiched between said end face of said lower housing and said flange, said resilient flex coupling being fixed to said upper flange and to said retention member by said plurality of retention fastener members, said resilient flex coupling being fixed to said lower housing by a plurality of coupling fastener members,
   wherein said lower housing and said upper flange are moveable relative to one another axially along said axis and relative to one another rotatably about said axis via flexing of said resilient flex coupling, wherein said resilient flex coupling has a first side with a first plurality of protrusions extending axially outwardly therefrom into engagement with said end face of said lower housing and a second side with a second plurality of protrusions extending axially outwardly therefrom into engagement with said upper flange.

11. The flex coupling assembly of claim 10, wherein said plurality of first protrusions includes a pair of first protrusions arranged diametrically opposite one another and said plurality of second protrusions includes a pair of second protrusions arranged diametrically opposite one another, said first pair of protrusions being arranged in circumferentially offset relation with said second pair of protrusions.

12. A flex coupling assembly for coupling a first shaft of a shaft assembly to a second shaft of the shaft assembly, comprising:
a lower shaft subassembly including,
a lower housing having a generally cylindrical housing wall extending along an axis and bounding a cavity between a lower housing first end and a lower housing second end, said lower housing first end having an end face extending generally transversely to said axis; and
a first shaft fixed to said end face of said lower housing and extending along said axis away from said cavity;
an upper shaft subassembly including,
an upper flange;
a second shaft fixed to said upper flange and extending along said axis; and
a retention member fixed to said upper flange by a plurality of retention fastener members; and
a resilient flex coupling operably coupling said lower shaft subassembly to said upper shaft subassembly, said resilient flex coupling allowing said lower housing and said flange to move relative to one another axially along said axis and relative to one another rotatably about said axis via flexing of said resilient flex coupling, said resilient flex coupling being fixed between said upper flange and said retention member by said plurality of retention fastener members, said resilient flex coupling being fixed to said lower housing by a plurality of coupling fastener members,
wherein said lower housing end face has a plurality of through openings, said plurality of retention fastener members extending through said plurality of through openings in clearance relation therewith, wherein said plurality of through openings act as a positive stop to limit the degree of relative rotation between said lower housing and said upper flange.

13. The flex coupling assembly of claim 12, wherein said lower housing has a plurality of elongate fastener receptacles extending in parallel relation to said axis in said cavity, said plurality of elongate fastener receptacles receiving said plurality of coupling fastener members therethrough, said retention member having a plurality of slots sized having a clearance fit with said plurality of elongate fastener receptacles, wherein said plurality of slots act as a positive stop to limit the degree of relative rotation between said lower housing and said upper flange.

14. The flex coupling assembly of claim 13, wherein said plurality of through openings and said plurality of slots are circumferentially offset from one another by about 90 degrees.

15. The flex coupling assembly of claim 12, further including a plurality of spacer members receiving said plurality of retention fastener members therethrough, said plurality of spacer members extending through said plurality of through openings in clearance relation therewith into engagement with said retention member and said resilient flex coupling.

16. The flex coupling assembly of claim 12, wherein said lower housing has a plurality of fastener receptacles extending in parallel relation to said axis in said cavity, said plurality of fastener receptacles receiving said plurality of coupling fastener members therethrough, said retention member having a plurality of slots sized providing a clearance fit with said fastener receptacles, wherein said plurality of slots have opposite radially extending sides that act as a positive stop to limit the degree of relative rotation between said lower housing and said flange.

17. The flex coupling assembly of claim 12, wherein said generally cylindrical housing wall and said retention member are spaced radially from one another by a gap and further including at least one bushing disposed in said gap, said at least one bushing limiting the degree of bending permitted between said first shaft and said second shaft.

18. A flex coupling assembly for coupling a first shaft of a shaft assembly to a second shaft of the shaft assembly, comprising:
a lower shaft subassembly including,
a lower housing having a generally cylindrical housing wall extending along an axis and bounding a cavity between a lower housing first end and a lower housing second end, said lower housing first end having an end face extending generally transversely to said axis; and
a first shaft fixed to said end face of said lower housing and extending along said axis away from said cavity;
an upper shaft subassembly including,
an upper flange;
a second shaft fixed to said upper flange and extending along said axis; and
a retention member fixed to said upper flange by a plurality of retention fastener members; and
a resilient flex coupling operably coupling said lower shaft subassembly to said upper shaft subassembly, said resilient flex coupling allowing said lower housing and said flange to move relative to one another axially along said axis and relative to one another rotatably about said axis via flexing of said resilient flex coupling, said resilient flex coupling being fixed between said upper flange and said retention member by said plurality of retention fastener members, said resilient flex coupling being fixed to said lower housing by a plurality of coupling fastener members, wherein said resilient flex coupling has a first side with a first plurality of protrusions extending axially outwardly therefrom into engagement with said end face of said lower housing and a second side with a second plurality of protrusions extending axially outwardly therefrom into engagement with said upper flange.

* * * * *